United States Patent
Bruehl

[19]

[11] Patent Number: 5,979,919
[45] Date of Patent: Nov. 9, 1999

[54] INDEPENDENT WHEEL SUSPENSION FOR STEERED WHEELS OF PASSENGER MOTOR VEHICLES AND THE LIKE

[75] Inventor: Hubert Bruehl, Waldstetten, Germany

[73] Assignee: DaimlerChrysler AG, Germany

[21] Appl. No.: 09/064,761

[22] Filed: Apr. 23, 1998

[30] Foreign Application Priority Data

Apr. 23, 1997 [DE] Germany .......................... 197 17 069

[51] Int. Cl.⁶ ................................ B62D 7/16; B60D 3/04
[52] U.S. Cl. ............................... 280/124.104; 280/93.51; 280/124.134; 280/124.145
[58] Field of Search ................... 280/93.515, 93.512, 280/93.514, 124.15, 124.135, 124.134, 124.145, 93.51, 124.104; 180/409

[56] References Cited

U.S. PATENT DOCUMENTS

| | | | |
|---|---|---|---|
| 4,819,959 | 4/1989 | Inoue et al. | 280/93.512 |
| 4,903,981 | 2/1990 | Alesso et al. | 180/409 |
| 5,048,860 | 9/1991 | Kanai et al. | 180/409 |
| 5,114,176 | 5/1992 | Sawai | 180/409 |

FOREIGN PATENT DOCUMENTS

| | | |
|---|---|---|
| 4-372408 | 12/1992 | Japan . |
| 07047824 | 2/1995 | Japan . |

*Primary Examiner*—Paul N. Dickson
*Assistant Examiner*—Lynda Jasmin
*Attorney, Agent, or Firm*—Evenson, McKeown, Edwards & Lenahan, P.L.L.C.

[57] ABSTRACT

An improved independent wheel suspension for steered wheels of passenger motor vehicles is provided. A three-arm anti-squat suspension has a virtual steering axis which coincides essentially with the rotation axis of the wheel carrier.

20 Claims, 4 Drawing Sheets

//5,979,919//

INDEPENDENT WHEEL SUSPENSION FOR STEERED WHEELS OF PASSENGER MOTOR VEHICLES AND THE LIKE

BACKGROUND AND SUMMARY OF THE INVENTION

This application claims the priority of German application 197 17 069.2, filed Apr. 23, 1997, the disclosure of which is expressly incorporated by reference herein.

The present invention relates to an independent wheel suspension for steered wheels of motor vehicles, particularly passenger cars, in the form of a three-arm anti-squat suspension.

Three-arm anti-squat suspensions typically comprise a lower A-arm, a wheel carrier connected therewith and guided on its upper end by way of a camber strut, and a connecting rod which connects the wheel carrier, offset to its linking to the A-arm, additionally with the A-arm and thereby supports it transversely to the plane defined by the linking points of the wheel carrier on the A-arm and of the camber strut on the wheel carrier and on the vehicle body. For aligning the wheel, the wheel carrier is additionally provided with a steering knuckle arm to which the tie rod is linked, whereby the wheel can be actively steered by way of the tie rod in connection with a steering gear.

With respect to steering movements, a swivelling of the wheel about a virtual axis is carried out in the such known three-arm anti-squat suspensions. The virtual axis is represented as an intersection line of two planes; specifically, the first of the two planes is defined by the linking points of the camber arm and the linking point of the wheel carrier on the A-arm, and the second of the planes is defined by the linking points of the connecting rod on the wheel carrier and the A-arm, and the linking point of the wheel carrier on the A-arm.

During steering movements which, in fact, take place by swivelling the wheel carrier and displacing its linking points, as the result of the corresponding displacements, the wheel is therefore placed in a position which would occur during the swivelling about the virtual axis. Because the virtual axis is set by the above-mentioned planes, specifically the first and the second plane and is not defined by the real linking points, the phase-shifted dynamic forces of the individual arms which act in these planes also result in torques about the real axis. Such dynamic forces are critical with respect to the steadiness of the steering of the vehicle. Correspondingly, wheel suspensions of this type, as known, for example, in JP 4-372 408 (A), are also sensitive with respect to elasticities in the many linking points which exist in such a wheel suspension.

Furthermore, in known wheel suspensions, in the frontal view, with an S-shaped curvature, the wheel carrier is relatively strongly curved toward the inside. Thus, in conjunction with a connecting rod which is upright in the frontal view but is clearly sloped toward the front in the lateral view, and with linking points of the wheel carrier on the A-arm and on the camber arm which, in the frontal view, are situated almost vertically above one another, while the real steering axis defined by these linking points is sloped toward the rear and upward, a relatively large space requirement exists for the wheel suspension and, during steering movements, relatively large spatial displacements will also occur for individual wheel suspension elements, which, in addition to effects partially endeavored for the wheel suspension, also has effects on the installation volume.

JP 07 047 824 A describes another three-arm anti-squat suspension, specifically for non-steered wheels of passenger cars, in which the wheel carrier is guided by way of a lower A-arm and an upper camber arm and is additionally supported by a connecting rod with respect to the A-arm. Furthermore, a steering knuckle arm is mounted on the wheel carrier and is supported elastically against the vehicle body by a tie rod extending in the transverse direction. The connecting rod, starting from the forward interior end area of the A-arm, extends diagonally toward the rear upwards against the wheel carrier. The second plane set by the linking points between the A-arm, the wheel carrier and the connecting rod and the first plane defined by the linking points of the camber arm and the linking point of the wheel carrier on the A-arm cross one another and have an intersection line which, starting from the linking point of the wheel carrier on the A-arm, both planes have in common. The intersection line also extends in the area of the linking point of the wheel carrier on the camber arm so that the virtual and the real steering axis have a similar course and, also in the area of the linking point of the camber arm on the wheel carrier, do not have a very large displacement. However, this displacement is desirable because this three-arm anti-squat suspension intended for non-steered wheels, in conjunction with the elastic support of the tie rod with respect to the vehicle body by swivelling the wheel carrier under the influence of longitudinal and lateral forces, must result in steering effects, specifically, under the influence of lateral forces, in the toe-in direction and, under the influence of longitudinal forces, in the toe-out direction, which result in a stabilizing of the vehicle.

An object of the present invention is to provide an improved wheel suspension to overcome the disadvantages and susceptibilities found in conventional suspensions.

According to the present invention, this object has been achieved by providing that the first plane defined by the linking point of the wheel carrier on the A-arm and the linking points of the camber arm and the second plane defined by the linking point of the wheel carrier on the A-arm and the linking points of the connecting rod have an intersection line which, starting from the linking point of the wheel carrier on the A-arm which the two planes have in common, in the upper area of the wheel carrier extends at least almost through the linking point of the wheel carrier on the camber arm. In top view, when the connecting rod is upright, the straight connection line between the linking points of the connecting rod on the wheel carrier and of the wheel carrier on the camber arm extends at an angle of approximately 45° with respect to the longitudinal plane of the vehicle which opens toward the outside in the driving direction.

Consequently, the virtual steering axis will practically coincide with the axis of rotation of the wheel carrier so that forces acting in the above-mentioned planes, particularly also dynamically acting forces (thus forces acting by way of the camber arm and the connecting rod) are always aimed at the steering axis and therefore result in no torques about the steering axis and therefore also neither generate a wheel fight nor impair the straight-ahead driving.

In addition to a wheel suspension construction which is compact in the longitudinal direction of the vehicle, the present invention also achieves, in connection with large steering angles, that the individual wheel suspension members experience only slight displacements so that, irrespective of possible large steering angles, a very compact construction can be implemented. Nevertheless, with increasing steering angles, a certain displacement of the steering axis is achieved, in the sense of an enlargement of the caster offset, in the upper area toward the rear which results in an increased aligning torque in the event of steering angles.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
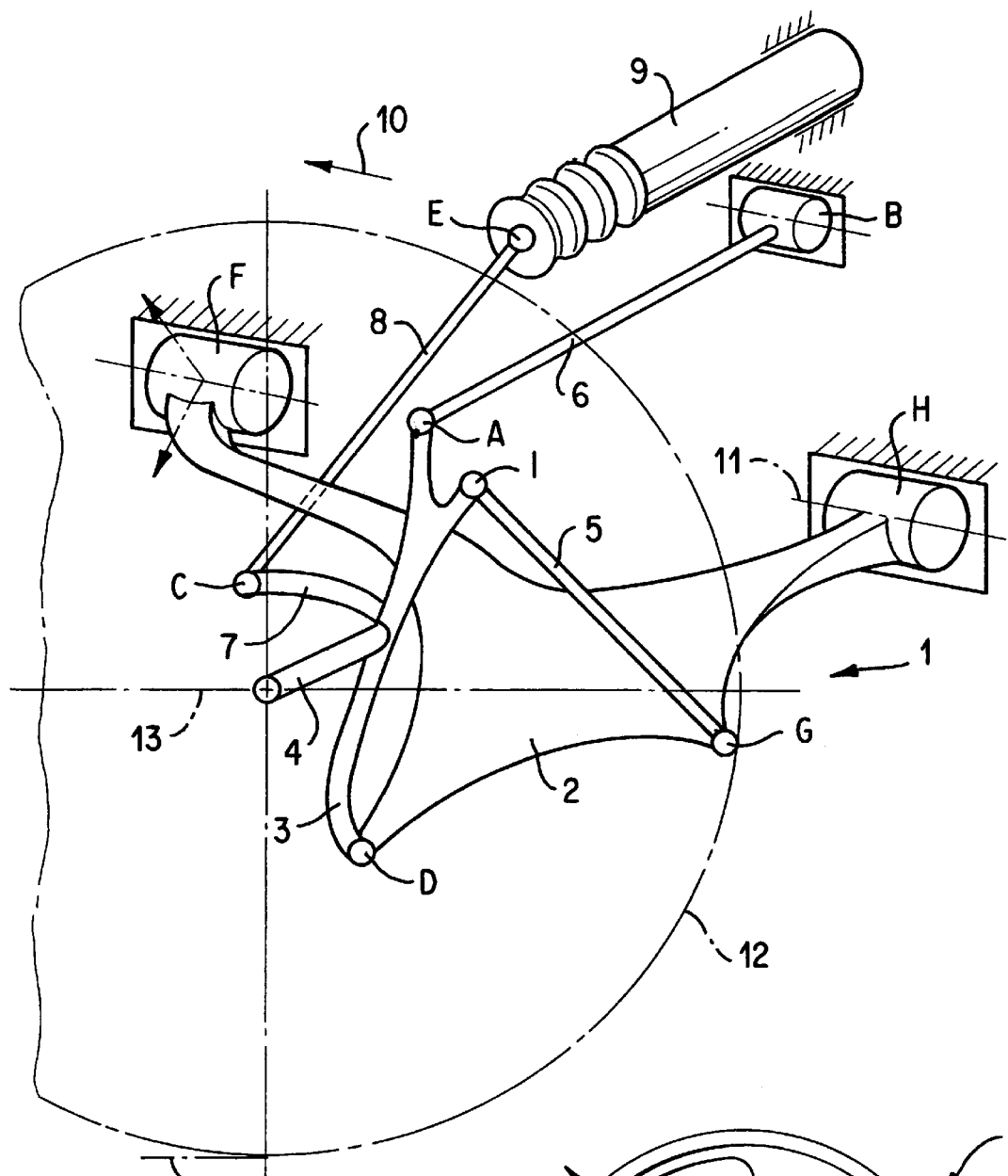
FIG. 1 is a schematic, perspective view of an independent wheel suspension according to the present invention shown as a steerable front wheel suspension.

An independent wheel suspension for the steered front wheels of a passenger car is designated in FIG. 1 by the numeral 1. This schematic representation illustrates only the components of the wheel suspension 1 but not details of the associated vehicle.

The wheel suspension 1 is constructed of a lower A-arm 2, a wheel carrier 3, a pivot 4 fixedly connected with the wheel carrier 3, a connecting rod 5, a camber arm 6, a steering knuckle arm 7 rigidly mounted on the wheel carrier 3 and a tie rod 8 which can be acted upon by a rack and pinion steering system 9.

At point A of its upper end, the wheel carrier 3 is connected in an articulated manner with the camber arm 6 which, in turn, by way of a pivot joint is connected in a conventional manner elastically at point B with the vehicle body. The steering knuckle arm 7 mounted on the wheel carrier 3 is connected in an articulated manner at point C with the tie rod 8 which, in turn, is connected in an articulated manner at point E with the rack and pinion steering system 9. At the lower end, the wheel carrier 3 is connected in a point D with the A-arm 2 which, in turn, by way of pivot joints is linked to the vehicle body side at points F, H which define the rotation axis 11 for the A-arm 2 which extends essentially in the longitudinal direction 10 of the vehicle or the driving direction. In view of the fact that the camber arm 6 can essentially absorb only forces acting in its longitudinal course, the wheel carrier 3 is, in addition, supported by the connecting rod 5 with respect to the A-arm 2, the corresponding linking points being marked G and I.

Together with the linking point A between the wheel carrier 3 and the camber arm 6 and the linking point B of the camber arm 6 on the vehicle body, linking point D of the wheel carrier 3 on the A-arm 2 defines a plane which roughly extends upright and in the transverse direction of the vehicle. This plane will be hereinbelow called "the first plane". A plane, which hereinbelow will be called "the second plane", is defined by the linking point D of the wheel carrier 3 on the A-arm 2 and the linking point G of the connecting rod 5 on this A-arm 2 as well as the linking point I of the connecting rod 5 on the wheel carrier 3.

The intersection line of the first and second planes determines a virtual steering axis which, in the case of the solution according to the invention, extends not only through the linking point D of the wheel carrier 3 on the A-arm 2, which, of course, pertains to both planes, but also through the linking point A of the wheel carrier 3 on the camber arm 6 so that the points A and D are each situated in both planes. The virtual axis coincides with the rotation axis of the wheel carrier 3 which is defined by the points A and D and which, in turn, is changed in space in its position by way of the connecting rod 5 during steering and suspension movements.

As the result of the intersection line of the first and the second plane, which determines the virtual steering axis, coinciding with the axis of rotation of the wheel carrier 3 defined by points A and D, forces acting in the direction of the planes, particularly also phase-shifted dynamic forces which are introduced by way of the connecting rod 5 and/or the camber arm 6, cause no torques onto the axis of rotation of the wheel carrier 3 and therefore also do not result in any wheel fight or impairments of the straight running for the wheel 12 disposed on the pivot 4.

According to another advantage of the invention, the connecting rod 5 assumes a position in which it is not only situated in the second plane, which it also helps to determine, but, in addition, has a course in the case of which the straight line defined by the linking points G of the connecting rod on the A-arm 2 and I of the connecting rod 5 on the wheel carrier 3 extends through the linking point A of the camber element 6 on the wheel carrier 3.

Figure 2:
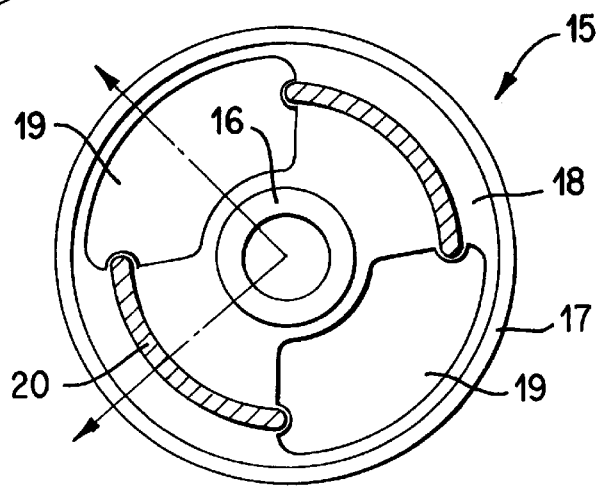
FIG. 2 is a schematic perspective view of a bearing.

Force components which act in the driving direction 10 onto the wheel carrier 3 are supported by the connecting rod 5 on the A-arm 2 and, in the bearings provided in the linking points F and H of the A-arm 2 with respect to the vehicle body and determining the axis of rotation 11 of the A-arm 2, of which one is shown in FIG. 2, cause supporting forces. For the shock forces 13 (shown by a broken line) introduced by way of the pivot 4 and for the braking forces 14 (shown by a dash-dotted line) introduced by way of the wheel circumference, the supporting forces essentially act at different angles with respect to one another and which, with respect to the aspect of comfort and vehicle handling, should be absorbed differently and, if possible, without influencing one another, specifically harder for the braking forces than for the shock forces. In view of the foregoing, it was found to be advantageous to use elastic bearings which are known per se at the linking point F but preferably also at the linking points F, H, which bearings have different elasticities in different directions. Thus, for example, known bearings with kidney-shaped recesses, in the case of which the kidney-shaped recesses extend transversely to the shock direction and the bearing segments which absorb the braking forces are constructed in solid material, optionally reinforced with metallic inserts.

Such a bearing will be explained in further detail by reference to FIG. 2. In the illustrated wheel suspension, a load which results from the braking force 14 is generated in the bearing assigned to the forward linking point F of the A-arm 2 which is directed diagonally downward, as well as a load resulting from the shock force 13 with a diagonally upward orientation, which causes a corresponding alignment of the elastic bearings. As a result, independently of the amount of the braking deceleration, the required elastic spring travel for cushioning shock events superimposed on the braking operation is essentially always maintained.

As a precaution, a bearing of the above-mentioned type is illustrated schematically as FIG. 2 and is generally designated by reference numeral 15. The bearing has a central bush 16 and, between the bush 16 and the jacket 17, an elastic insert 18 in which kidney-shaped recesses 19 are provided. Relative to the center of the bush, the recesses 19 are situated opposite one another and, viewed in the circumferential direction, enclose between one another areas of a higher stiffness, particularly areas constructed of a solid material which optionally are reinforced by metallic inserts 20. Corresponding to the load directions which are situated essentially perpendicularly to one another in the bearing 15 and result from shock forces 13 and braking forces 14, the construction of the bearing is also such that its zones of different flexibility are situated essentially perpendicularly with respect to one another.

Figure 3:
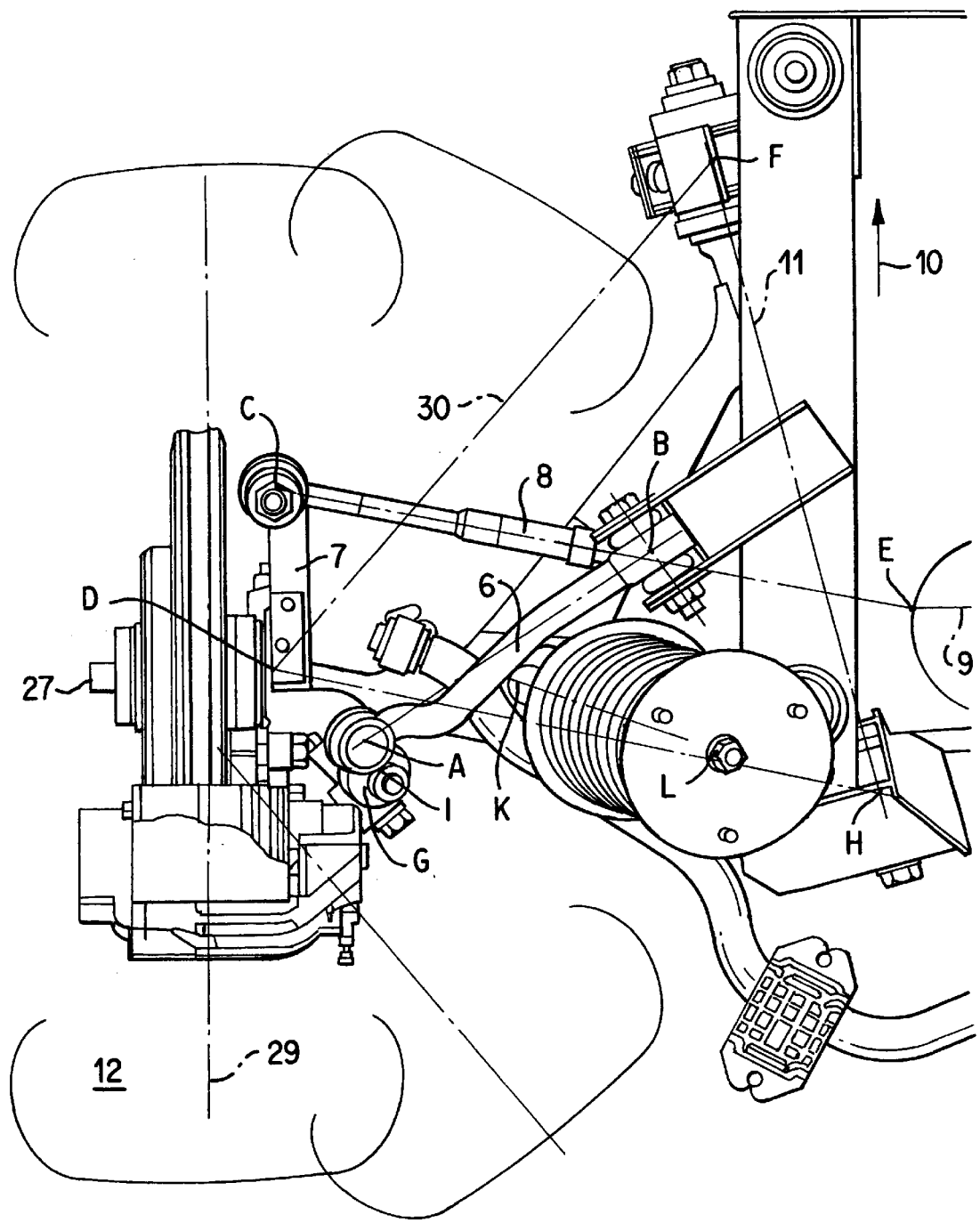
FIG. 3 is a top view of a more detailed embodiment of a wheel suspension according to the present invention.
Figure 4:
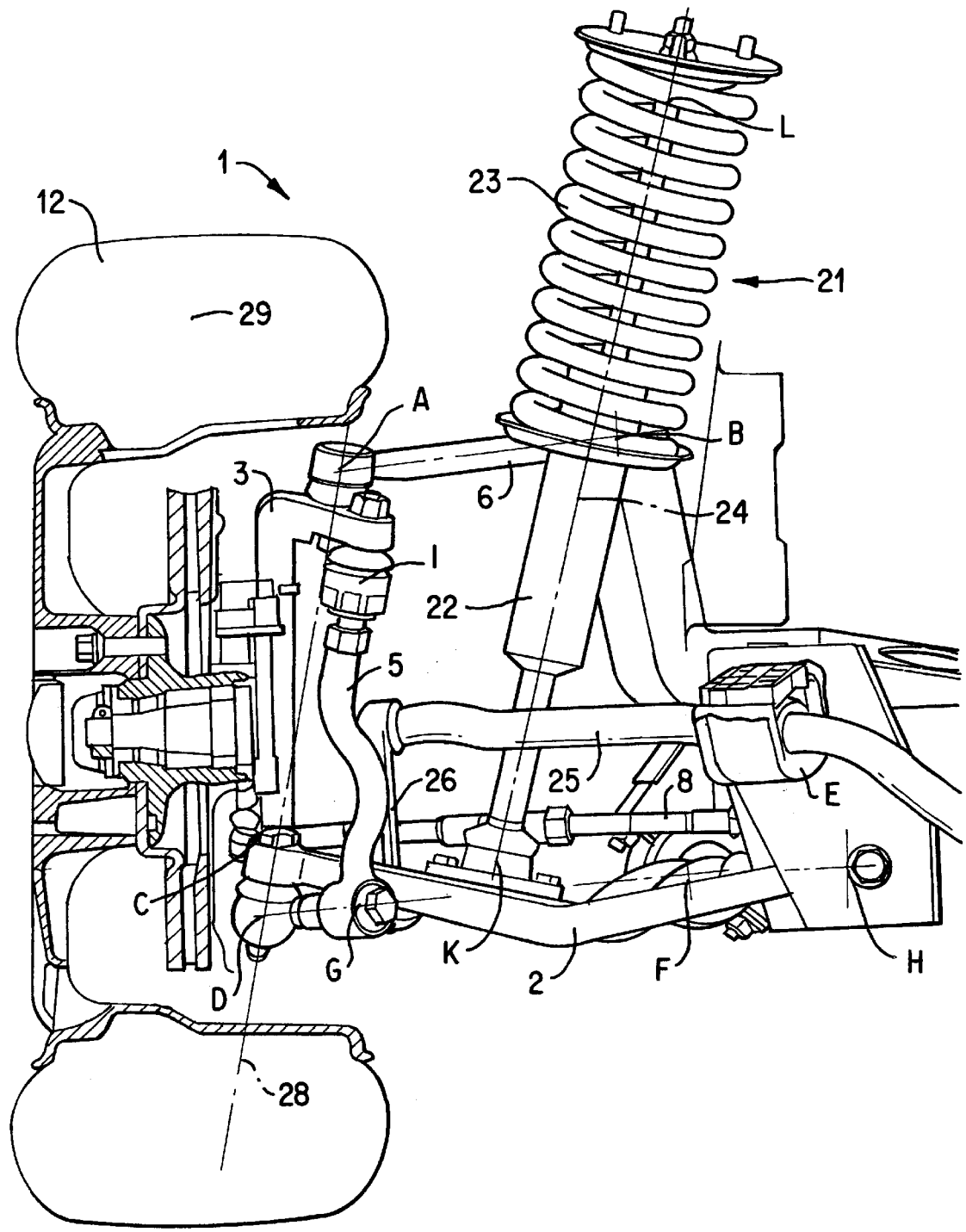
FIG. 4 is a rear view of the wheel suspension shown in FIG. 3.
Figure 5:
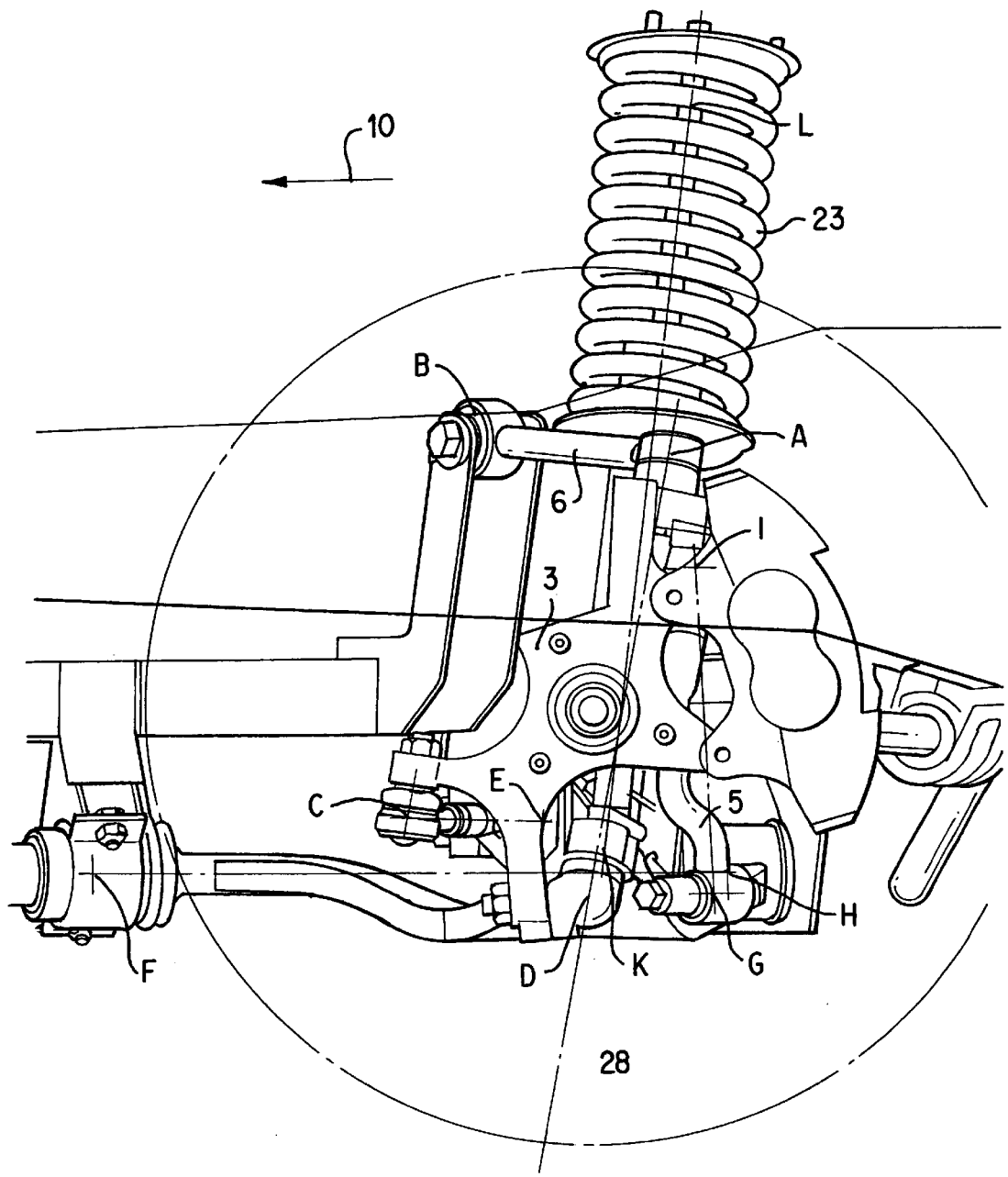
FIG. 5 is a side view of the wheel suspension shown in FIGS. 3 and 4.

FIGS. 3 to 5 illustrate somewhat schematically a contemplated embodiment of the present invention of a wheel suspension for front wheels of vehicles. Vehicle body parts and details of the wheel suspension and the wheels themselves are not illustrated because they are not necessary for understanding the invention and will detract from clarity. Furthermore, the reference numerals of FIG. 1 are again used as reference numerals for corresponding parts of FIGS. 3 to 5.

Supplementing FIG. 1, FIGS. 3 to 5 show the spring-and-damper combination 21, consisting of the damper 22 and of the spring 23 surrounding it in its upper area. The damper 22 and the spring 23 are jointly supported with respect to the vehicle body and the A-arm 2. The respective linking points being marked K and L, the linking point K being situated in the connection of the spring-and-damper combination 21 with the A-arm 2. In a horizontal course of the rotation axis 11 of the A-arm 2 and a slope indicated in the top view of FIG. 3 diagonally to the front and outside at an angle of approximately 15° with respect to the vehicle longitudinal center plane, the axis 24 of the spring-and-damper combination 21 is arranged in the rear view according to FIG. 4 at an angle of approximately 15° extending diagonally upwards and to the inside, with approximately the same slope, thus of a slope of also approximately 15° in the lateral view diagonally to the rear and upwards as seen in FIG. 3.

In addition, FIGS. 3 to 5 illustrate the arrangement of the stabilizer 25 which is connected with the A-arm 2 by way of a hinged support 26. The linking of the hinged support 26 essentially takes place in the same longitudinal plane as the linking of the connecting rod but, relative to the wheel center transverse plane 27 in FIG. 3, slightly offset with respect to it toward the front in the driving direction 10. Relative to the driving direction 10, the connecting rod 5 is situated behind the wheel center transverse plane 27. In the rear view, the stabilizer 25 extends in the area of the wheel suspension offset upwards with respect to the A-arm 2. In a U-shaped basic form the stabilizer 25, as illustrated in FIG. 3 extends, by way of its leg ending against the hinged support 26, diagonally toward the front and outside, approximately at an angle of 45°.

Relative to the wheel center transverse plane 27 and the driving direction 10, the rearward linking point H of the A-arm 2 is situated behind the wheel center transverse plane 27. The forward linking point F is displaced by a multiple amount toward the front with respect to the wheel center transverse plane 27. The distance of the linking point F to the wheel center transverse plane 27 is approximately six times larger than the distance of the linking point H, measured in the opposite direction.

Support of the spring-and-damper combination 21 with respect to the A-arm 2 takes place like the linking of the hinged support 26 close to the wheel center transverse plane 27 in which the linking point D of the A-arm 2 on the wheel support 3 is situated. The steering knuckle arm 7 extends in the driving direction 10 toward the front, and the linking point C of the tie rod 8 on the steering knuckle arm 7, in the lateral view, is displaced with respect to the linking point E of the tie rod 8 on the rack and pinion steering system 9 toward the front in the driving direction 10.

In top view, the tie rod 8 crosses the axis of the camber arm 6 almost in the linking point B of the camber arm 6 on the vehicle body. The straight connection line 30 between the linking point D of the A-arm 2 on the wheel carrier 3 with the forward vehicle-body-side linking point F of the A-arm 2 extends at an angle of approximately 50° with respect to the wheel center transverse plane 27 diagonally toward the front and inside.

The slope of the camber arm 6 with respect to the wheel center transverse plane 27 is slightly flatter at approximately 35° In the rear view, the camber arm 6 extends in a slightly rising manner toward the front inside almost horizontally, and the length of the camber arm 6 is slightly larger than half the radial length of the A-arm 2.

In top view, the linking point A of the camber arm 6 on the wheel carrier 3 is situated almost on a line with the linking points I, G of the connecting rod 5 on the wheel carrier 3 and on the A-arm 2. The straight connection line extends between the above-mentioned linking points G, I and A approximately at an angle of 40° with respect to a vehicle transverse plane diagonally toward the front and outside. The connecting rod 5 extends between its linking points G, I vertically in the rear view, and at a slope of a few degrees toward the top front in the driving direction in the lateral view, so that, overall, the course of the connecting rod is almost vertical.

The axis of rotation 28 of the wheel carrier 3 defined by the linking points A and D of the wheel carrier 3 on the camber arm 6 and the A-arm 2 penetrates the floor pane at a narrow distance offset toward the longitudinal center of the vehicle close to the wheel center longitudinal plane 29. Thereby, a small positive kingpin offset exists, specifically with a positive caster, in the case of the slope of the axis of rotation 28 of the wheel carrier 3, which is defined by the linking points A and B, in the lateral view amounting to approximately 10° with respect to the wheel center transverse plane 27.

The second plane defined by the linking points D, G, I intersects the first plane defined by the linking points D, A, B essentially in an intersection line, which coincides with the axis of rotation 28. Thereby, the rotation axis practically coincides with the virtual axis of rotation formed by the intersection point of the mentioned planes. In addition, the linking points G, I of the connecting rod 5 on the A-arm 3 and on the wheel carrier 3 with the linking point A of the camber arm 6 on the wheel carrier 3 are situated almost on a line resulting in optimal supporting conditions.

This also applies to the anti-dive support and to caster changes which are favorably influenced by the position of the rotation axis 11 of the A-arm 2. In addition, this further development of the wheel suspension has favorable effects on the straight-ahead running of the vehicle and the steadiness of steering at small steering angles. Because of the resulting displacement of the steering axis toward the rear in the event of increasing steering angles, an enlargement of the caster offset is also achieved and results in an increase of the aligning torque onto the straight-ahead position of the wheel while also improves the steering stability.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An independent wheel suspension for steered wheels of motor vehicles, comprising a three-arm anti-squat suspension having a lower A-arm with a vehicle-body-side rotation axis extending in a vehicle longitudinal driving direction which is defined by a control arm bearing which is forward relative to the driving direction and by a rearward control arm bearing, the lower A-arm, laterally offset to the outside with respect to a rotation axis thereof, is connected with a wheel carrier, guided in an upper end area thereof by a camber arm, which is connected relative to the driving direction behind a wheel center transverse plane in an articulated manner with the wheel carrier and which is linked to the vehicle body side; a connecting rod which connects the wheel carrier and the A-arm and which, extending in a vertical direction, relative to the driving direction, is connected in an articulated manner behind the wheel center transverse plane in an upper end area thereof with the wheel carrier and in a lower end area thereof with the A-arm; and a steering knuckle arm which projects from the wheel carrier and is connected in an articulated manner with a tie rod, a first plane being defined by the linking point of the wheel carrier on the A-arm and the linking points of the camber arm, and a second plane being defined by the linking point of the wheel carrier on the A-arm and the linking points of the connecting rod, wherein the first plane and the second plane share an intersection line, starting from the linking point of the wheel carrier on the A-arm and extends in the upper end area of the wheel carrier at least almost through the linking point of the wheel carrier on the camber arm, and, in top view, the connecting rod being upright, the linking point of the camber arm is situated approximately on a line with at least one of the linking points of the connecting rod on the wheel carrier and on the A-arm, which line extends at approximately 45° with respect to the vehicle longitudinal plane opening toward the outside in the vehicle driving direction.

2. The independent wheel suspension according to claim 1, wherein the linking point of the camber arm on the wheel carrier is situated closer to the wheel center transverse plane than the linking point of the connecting rod on the wheel carrier.

3. The independent wheel suspension according to claim 2, wherein the straight line defined by the linking points of the connecting rod extends at least almost through the linking point of the wheel carrier on the camber arm.

4. The independent wheel suspension according to claim 1, wherein the rotation axis of the A-arm extends at approximately 15° with respect to a vehicle longitudinal axis.

5. The independent wheel suspension according to claim 4, wherein the linking point of the camber arm on the wheel carrier is situated closer to the wheel center transverse plane than the linking point of the connecting rod on the wheel carrier.

6. The independent wheel suspension according to claim 5, wherein the straight line defined by the linking points of the connecting rod extends at least almost through the linking point of the wheel carrier on the camber arm.

7. The independent wheel suspension according to claim 1, wherein a linking point which is forward in the driving direction and a rearward linking point of the A-arm are situated on different sides of the wheel center transverse plane, and the distance of the forward linking point with respect to the wheel center transverse plane amounts to several times a distance of the rearward linking point with respect to the wheel center transverse plane.

8. The independent wheel suspension according to claim 1, wherein the connecting rod extends approximately vertically.

9. The independent wheel suspension according to claim 1, wherein the second plane defined by the linking points of the wheel carrier on the A-arm and of the connecting arm is approximately vertical.

10. The independent wheel suspension according to claim 1, wherein the camber arm extends from a linking point thereof at the wheel carrier diagonally toward the front and inside.

11. The independent wheel suspension according to claim 10, wherein the camber arm encloses an angle of approximately 55° with a vehicle longitudinal axis.

12. The independent wheel suspension according to claim 1, wherein the linking point of the wheel carrier on the A-arm extends approximately in the wheel center transverse plane.

13. The independent wheel suspension according to claim 1, wherein the steering knuckle arm extends from the wheel carrier in the driving direction toward the front.

14. The independent wheel suspension according to claim 1, wherein the tie rod extends from the steering knuckle arm at a flat angle with respect to a vehicle transverse plane diagonally toward the rear and inside.

15. The independent wheel suspension according to claim 1, wherein, in top view, an axis of the tie rod extends approximately through the vehicle-body-side linking point of the camber arm.

16. The independent wheel suspension according to claim 1, wherein a radial swivel length of the camber arm corresponds approximately to half a radial swivel length of the A-arm.

17. The independent wheel suspension according to claim 1, wherein the A-arm is supported by a spring-and-damper combination against the vehicle body, and a linking point of the spring-and-damper combination with respect to the A-arm is situated close to the wheel center transverse plane.

18. The independent wheel suspension according to claim 17, wherein an axis of the spring-and-damper combination, in rear view, extends at approximately 15° diagonally upwards and inward.

19. The independent wheel suspension according to claim 18, wherein an axis of the spring-and-damper combination, in the side view, extends at approximately 15° diagonally to the rear and upwards.

20. The independent wheel suspension according to claim 19, wherein the axis of the spring-and-damper combination, in rear view, extends at approximately 15° diagonally upwards and inward.

* * * * *